United States Patent [19]

Ziegenberg et al.

[11] Patent Number: 5,214,710
[45] Date of Patent: May 25, 1993

[54] PERMANENT MAGNET SYSTEM WITH ASSOCIATED COIL ARRANGEMENT

[75] Inventors: Alfred Ziegenberg, Villingen-Schwenningen; Edmund Schiessle, Schorndorf, both of Fed. Rep. of Germany

[73] Assignee: Mercedes-Benz AG, Fed. Rep. of Germany

[21] Appl. No.: 729,409

[22] Filed: Jul. 5, 1991

[30] Foreign Application Priority Data

Jul. 7, 1990 [DE] Fed. Rep. of Germany ....... 4021651

[51] Int. Cl.$^5$ ............................................. H04R 25/00
[52] U.S. Cl. .................................... 381/199; 381/194; 381/201
[58] Field of Search ............... 381/192, 194, 199, 200, 381/201, 195, 196, 197

[56] References Cited

U.S. PATENT DOCUMENTS

| | | | |
|---|---|---|---|
| 3,665,124 | 5/1972 | Sotome | 381/195 |
| 4,868,882 | 9/1989 | Ziegenberg et al. | 381/200 |

FOREIGN PATENT DOCUMENTS

| | | | |
|---|---|---|---|
| 3730305 | 3/1989 | Fed. Rep. of Germany . | |
| 3936639 | 3/1991 | Fed. Rep. of Germany | 381/199 |
| 4021651 | 6/1991 | Fed. Rep. of Germany | 381/199 |
| 0290298 | 12/1987 | Japan | 381/199 |
| 0237396 | 9/1990 | Japan | 381/199 |

OTHER PUBLICATIONS

Ekktor Nov. 1988-pp. 14 & 16-"Der Digitale Lautsprecher ist im Kommen der Lautsprecher als D/A--Wandler".

Primary Examiner—Jin F. Ng
Assistant Examiner—Huyen D. Le
Attorney, Agent, or Firm—Evenson, Wands, Edwards, Lenahan & McKeown

[57] ABSTRACT

The invention relates to a permanent magnet system with associated coil arrangement, the permanent magnet system consisting of two axially polarized permanent magnet rings which are mounted one behind another in the axial direction, like poles of the permanent magnet rings being opposite one another, the two permanent magnet rings being distanced from one another by a soft magnetic spacing washer, the permanent magnet rings being surrounded on the outside by a coil in such a way that the coil central axis coincides with the central axis of the permanent magnet rings, the center of the coil being located in the normal position of the coil at the level of the soft magnetic spacing washer, at least one coil being located inside the inside diameter of the permanent magnet ring in such a way that the coil central axis of the coils coincides with the central axis of the permanent magnet rings, the center of the coils being located in the normal position of the coils at the level of the soft magnetic spacing washer. There are possible uses in loudspeakers and sensors.

26 Claims, 4 Drawing Sheets

PERMANENT MAGNET SYSTEM WITH ASSOCIATED COIL ARRANGEMENT

BACKGROUND AND SUMMARY OF THE INVENTION

The present invention relates to a permanent magnet system with associated coil arrangement that has two axially polarized permanent magnet rings which are mounted one behind another in the axial direction with like poles of the permanent magnet rings being opposite one another, and a soft magnetic spacing washer arranged between the two permanent magnet rings. A coil surrounds the outside of the permanent magnet rings such that a central axis of the coil coincides with a central axis of the permanent magnet rings, an axial center of the coil being located in a normal position of the coil at a level of the soft magnetic spacing washer.

A permanent magnet system with associated coil arrangement is disclosed in German Patent Document 3,730,305 A1, in which the permanent magnet system consists of two axially polarized permanent magnet rings which are mounted behind one another in the axial direction and whose like poles are opposite one another. In this arrangement, the permanent magnet rings are separated by a soft magnetic spacing washer. The permanent magnet system is surrounded by a coil arrangement in such a way that the coil central axis is identical to the central axes of the permanent magnet rings, the coil surrounding the permanent magnet rings concentrically on the outside, and the center of the coil being located at the level of the soft magnetic spacing washers.

An object of the present invention is to provide a permanent magnet system with associated coil arrangement configured so as to produce as high a degree of efficiency as possible in the conversion of a mechanical movement into an electrical variable, or in the conversion of an electrical variable into a mechanical movement, while providing as small a unit volume as possible and as small a weight as possible of the permanent magnet system with associated coil arrangement.

This and other objects are achieved by the present invention which provides a permanent magnet system with associated coil arrangement that has two axially polarized permanent magnet rings which are mounted one behind another in the axial direction with like poles of the permanent magnet rings being opposite one another, and a soft magnetic spacing washer arranged between the two permanent magnet rings. A first coil surrounds the outside of the permanent magnet rings such that a central axis of the first coil coincides with a central axis of the permanent magnet rings, an axial center of the first coil being located in a normal position of the first coil at a level of the soft magnetic spacing washer. At least a second coil is located inside an inside diameter of the permanent magnet rings such that the central axis of the second coil coincides with the central axis of the permanent magnet rings, the center of the second coil being located in a normal position of the second coil at the level of the soft magnetic spacing washer.

In the permanent magnet system with associated coil arrangement according to the present invention, the magnetic field produced by the permanent magnet system is used in a particularly optimum fashion, by virtue of the fact that in addition to the coils surrounding the permanent magnet rings on the outside, coils are inserted into the inner opening of the permanent magnet rings. Consequently, the magnetic field which forms inside the permanent magnet rings is also utilized.

Other objects, advantages and novel features of the present invention will become apparent from the following detailed description of the invention when considered in conjunction with the accompanying drawings.

DETAILED DESCRIPTION OF THE DRAWINGS

Figure 1:
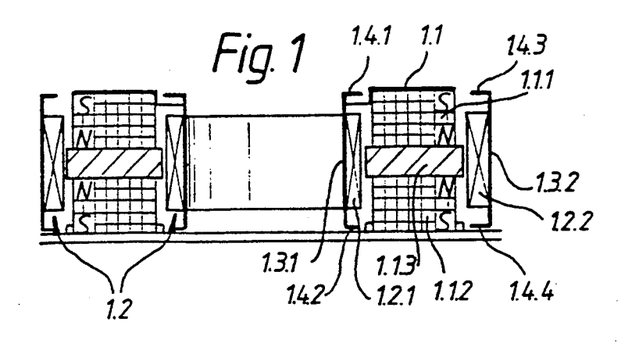
FIG. 1 shows a first embodiment of a permanent magnet system with associated coil arrangement constructed according to an embodiment of the present invention.

As is evident from FIG. 1, the permanent magnet system 1.1. comprises a first axially polarized permanent magnet ring 1.1.1 and a second permanent magnet ring 1.1.2 arranged behind this first permanent magnet ring 1.1.1 in the axial direction. The like poles of the permanent magnet rings 1.1.1 and 1.1.2 are opposite one another. In the exemplary embodiment of FIG. 1, these are the north poles of the permanent magnet rings 1.1.1 and 1.1.2. The two permanent magnet rings 1.1.1 and 1.1.2 are separated by a soft magnetic spacing washer 1.1.3, which in an advantageous embodiment has a smaller diameter of its inner opening and a larger outside diameter than the permanent magnet rings and 1.1.2. As a result, a particularly intense focusing of the magnetic field is achieved, since the magnetic field lines representing the magnetic field are thereby largely prevented from escaping in the radial direction from the permanent magnet rings 1.1.1 and 1.1.2.

Mounted as a part of this permanent magnet system 1.1 is a coil arrangement 1.2 which includes the coils 1.2.1 and 1.2.2. In this arrangement, the coil 1.2.1 is located concentrically inside the inner opening of the annular permanent magnet system 1.1, which includes the permanent magnet rings 1.1.1 and 1.1.2 and the soft magnetic spacing washer 1.1.3. The center of the coil 1.2.1 is located in the normal position at the level of the soft magnetic spacing washer 1.1.3. The coil 1.2.2 surrounds the annular permanent magnet system 1.1 concentrically from the outside in this arrangement, the center of the coil 1.2.2 being located in the normal position at the level of the soft magnetic spacing washer 1.1.3.

Thin rings 1.3.1 and 1.3.2 of an amorphous, very soft magnetic and non-magnetostrictive material, for example, a metal foil, can be respectively mounted in this arrangement on the inner lateral surface of the coil 1.2.1 and on the outer lateral surface of the coil 1.2.2. A further improvement in the guidance of the magnetic flux can be achieved by virtue of the fact that the rings 1.3.1 and 1.3.2 are provided with right-angled extensions 1.4.1, 1.4.2, 1.4.3 and 1.4.4 which are constructed in such a way that the magnetic field is guided from one pole to the other largely without leakage.

Because of the lower weight of the coil arrangement 1.2 by comparison with the permanent magnet system 1.1, in the illustrated embodiment the permanent magnet system 1.1 is fixedly mounted and the coil arrangement 1.2 is movably mounted. This produces a higher sensitivity of the permanent magnet system 1.1 with associated coil arrangement 1.2 when used in a loudspeaker or a sensor. It is also possible, however, in principle for the coil arrangement 1.2 to be mounted fixed and the permanent magnet system 1.1 movably.

Figure 2:
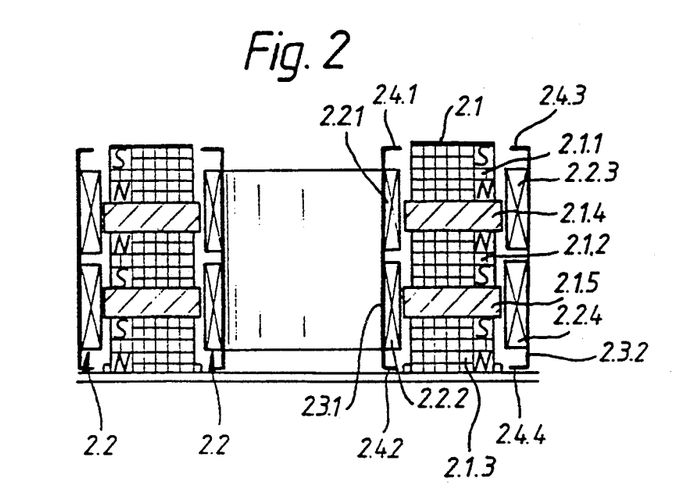
FIG. 2 shows a second embodiment of a permanent magnet system with associated coil arrangement according to the invention.

FIG. 2 is an embodiment of a permanent magnet system 2.1 with associated coil arrangement 2.2 according to the invention which is extended in the axial direction by comparison with the embodiment of FIG. 1. In this arrangement, the permanent magnet system 2.1 comprises a first axially polarized permanent magnet ring 2.1.1, and a second permanent magnet ring 2.1.2 arranged behind this first permanent magnet ring 2.1.1 in the axial direction, and a third permanent magnet ring 2.1.3 arranged behind the first and second permanent magnet rings 2.1.1 and 2.1.2 likewise in the axial direction. Like poles of the permanent magnet rings 2.1.1, 2.1.2 and 2.1.3 are opposite one another in each case. In the exemplary embodiment of FIG. 2, these are the north poles of the permanent magnet rings 2.1.1 and 2.1.2 and the south poles of the permanent magnet rings 2.1.2 and 2.1.3.

The two permanent magnet rings 2.1.1 and 2.1.2 and the two permanent magnet rings 2.1.2 and 2.1.3 are separated in each case by a soft magnetic spacing washer 2.1.4 and 2.1.5, which in a particularly advantageous embodiment have a smaller diameter than the permanent magnet rings 2.1.1, 2.1.2 and 2.1.3. As a result, a particularly intense focusing of the magnetic field can be achieved, since the magnetic field lines representing the magnetic field are thereby largely prevented from escaping in the radial direction from the permanent magnet rings 2.1.1, 2.1.2 and 2.1.3.

Mounted as part of this permanent magnet system 2.1 is a coil arrangement 2.2 which comprises the coils 2.2.1, 2.2.2, 2.2.3 and 2.2.4. In this arrangement, the coils 2.2.1 and 2.2.2 are located concentrically inside the inner opening of the annular permanent magnet system 2.1 which comprises the permanent magnet rings 2.1.1, 2.1.2 and 2.1.3 and the soft magnetic spacing washers 2.1.4 and 2.1.5. The center of the coil 2.2.1 is located in the normal position at the level of the soft magnetic spacing washer 2.1.4, and the center of the coil 2.2.2 is located in the normal position at the level of the soft magnetic spacing washer 2.1.5. The coils 2.2.3 and 2.2.4 of the coil arrangement 2.2 surround the annular permanent magnet system 2.1 concentrically from the outside in this arrangement, the center of the coil 2.2.3 being located in the normal position at the level of the soft magnetic spacing washer 2.1.4, and the center of the coil 2.2.4 being located in the normal position at the level of the soft magnetic spacing washer 2.1.5.

Thin rings 2.3.1 and 2.3.2 of an amorphous, very soft magnetic and non-magnetostrictive material, for example, a metal foil, is respectively mounted in this embodiment on the inner lateral surfaces of the coils 2.2.1 and 2.2.2 and on the outer lateral surfaces of the coils 2.2.3 and 2.2.4. A further improvement in the guidance of the magnetic flux is achieved by virtue of the fact that the rings 2.3.1 and 2.3.2 are provided with right-angled extensions 2.4.1, 2.4.2, 2.4.3 and 2.4.4 which are constructed in such a way that the magnetic field is guided from one pole to the other largely without leakage.

Because of the use of four instead of two coils, the arrangement according to FIG. 2 has twice the sensitivity of the arrangement according to FIG. 1, the size increasing, however, by a factor of less than two, since the permanent magnet ring 2.1.2 is used to generate the magnetic field both for the coils 2.2.1 and 2.2.3 and for the coils 2.2.2 and 2.2.4. It is also possible in principle to further enhance the response sensitivity of the permanent magnet system with associated coil arrangement according to the present invention by further extending the permanent magnet system with associated coil arrangement in the axial direction in accordance with the transition from the exemplary embodiment of FIG. 1 to the exemplary embodiment of FIG. 2.

Because of the lower weight of the coil arrangement 2.2 by comparison with the permanent magnet system 2.1, in this arrangement the permanent magnet system 2.1 is fixedly mounted and the coil arrangement 2.2 movably mounted, producing a higher sensitivity of the permanent magnet system 2.1 with associated coil arrangement 2.2 when used in a loudspeaker or a sensor. It is also possible, however, in principle for the coil arrangement 2.2 to be fixedly mounted and the permanent magnet system 2.1 movably mounted.

Figure 3:
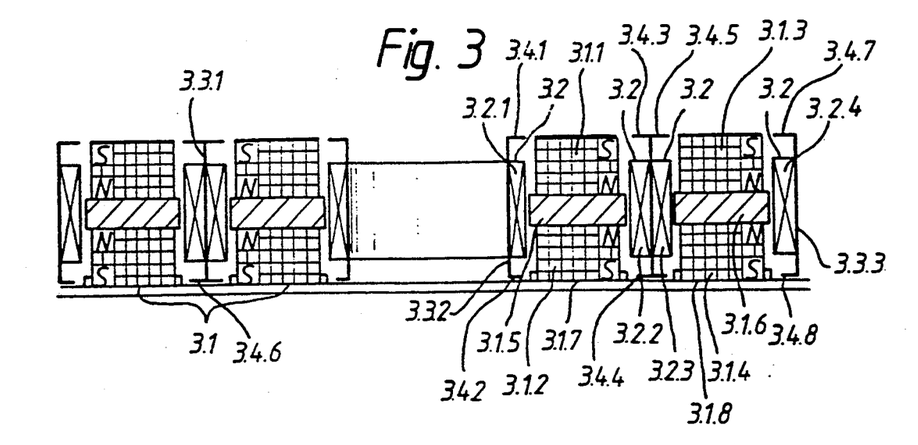
FIG. 3 shows a third embodiment of a permanent magnet system with associated coil arrangement according to the invention.

FIG. 3 shows an embodiment of a permanent magnet system 3.1 with associated coil arrangement 3.2 according to the invention which is extended in the radial direction by comparison with the embodiment of FIG. 1. In this arrangement, the permanent magnet system 3.1 comprises a first axially polarized permanent magnet ring 3.1.1, a second permanent magnet ring 3.1.2 arranged behind this first permanent magnet ring 3.1.1 in the axial direction, a third permanent magnet ring 3.1.3 which has a diameter such that it surrounds the permanent magnet ring 3.1.1 on the outside, and a fourth permanent magnet ring 3.1.4 which has a diameter such that it surrounds the permanent magnet ring 3.1.2 on the outside. Like poles of the permanent magnet rings 3.1.1 and 3.1.3 are directly adjacent, like poles of the permanent magnet rings 3.1.2 and 3.1.4 are directly adjacent, and like poles of the permanent magnet rings 3.1.1 and 3.1.2 and 3.1.3 and 3.1.4 are opposite one another in each case. In the exemplary embodiment of FIG. 3, these are the north poles of the permanent magnet rings 3.1.1 and 3.1.2 and the north poles of the permanent magnet rings 3.1.3 and 3.1.4.

The two permanent magnet rings 3.1.1 and 3.1.2 and the two permanent magnet rings 3.1.3 and 3.1.4 are separated in each case by a soft magnetic spacing washer 3.1.5 and 3.1.6, the soft magnetic spacing washer 3.1.5 having a smaller diameter of the inner opening than the permanent magnet rings 3.1.1 and 3.1.2 and a larger Outside diameter than the permanent magnet rings 3.1.1 and 3.1.2. As shown in the embodiment of FIG. 3, the soft magnetic spacing washer 3.1.6 has a smaller diameter of the inner opening than the permanent magnet rings 3.1.3 and 3.1.4 and a larger outside diameter than the permanent magnet rings 3.1.3 and 3.1.4. As a result, a particularly intense focusing of the magnetic field can be achieved, since the magnetic field lines representing the magnetic field are thereby largely prevented from escaping in the radial direction from the permanent magnet rings 3.1.1 and 3.1.2 and 3.1.3 and 3.1.4.

Mounted as a part of this permanent magnet system 3.1 is a coil arrangement 3.2 which consists of the coils 3.2.1, 3.2.2, 3.2.3 and 3.2.4. In this arrangement, the coil 3.2.1 is located concentrically inside the inner opening of the inner part 3.1.7 of the permanent magnet system 3.1. This inner part comprises the permanent magnet rings 3.1.1 and 3.1.2 and the soft magnetic spacing washer 3.1.5.

The coils 3.2.2 and 3.2.3 of the coil arrangement 3.2 surround the inner part of the annular permanent magnet system 3.1 concentrically from the outside in this arrangement and are located at the same time inside the inner opening of the outer part 3.1.8 of the permanent magnet system 3.1. This outer part comprises the permanent magnet rings 3.1.3 and 3.1.4 and the soft magnetic spacing washer 3.1.6. In this arrangement, the coil 3.2.4 concentrically surrounds the outer part 3.1.8 of the permanent magnet system 3.1.

In this embodiment, the coils 3.2.2 and 3.2.3 are separated by a thin ring 3.3.1 of an amorphous, very soft magnetic and nonmagnetostrictive material, for example, a metal foil. The centers of the coils 3.2.1 and 3.2.2 are located in the normal position at the level of the soft magnetic spacing washer 3.1.5, and the centers of the coils 3.2.3 and 3.2.4 are located at the level of the soft magnetic spacing washer 3.1.6.

Thin-walled rings 3.3.2 and 3.3.3 which improve the magnetic flux are mounted on the inner lateral surface of the coil 3.2.1 and on the outer lateral surface of the coil 3.2.4. A further improvement in the guidance of the magnetic flux is achieved by virtue of the fact that the rings 3.3.1, 3.3.2 and 3.3.3 are provided with right-angled extensions 3.4.1, 3.4.2, 3.4.3, 3.4.4, 3.4.5, 3.4.6, 3.4.7 and 3.4.8 Which are constructed in such a way that the magnetic field is guided from one pole to the other largely without leakage. Because of the use of four instead of two coils, the arrangement according to FIG. 3 has twice the sensitivity of the arrangement according to FIG. 1, the increase in size taking place in the radial direction, so that the very small height of the permanent magnet system according to the invention is retained in a particularly advantageous way.

Because of the lower weight of the coil arrangement 3.2 by comparison with the permanent magnet system 3.1, in this arrangement the permanent magnet system 3.1 is fixedly mounted and the coil arrangement 3.2 movably mounted, producing a higher sensitivity of the permanent magnet system 3.1 with associated coil arrangement 3.2 when used in a loudspeaker or a sensor. It is also possible, however, in principle for the coil arrangement 3.2 to be fixedly mounted and the permanent magnet system 3.1 movably mounted.

Figure 4:
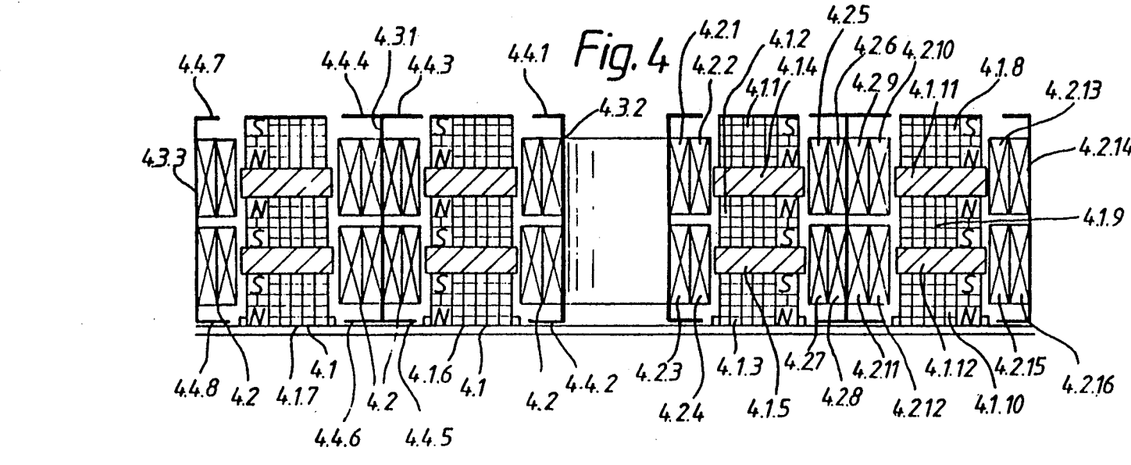
FIG. 4 shows a fourth embodiment of a permanent magnet system with associated coil arrangement according to the invention.

It is also possible to further enhance the response sensitivity of the permanent magnet system with associated coil arrangement according to the invention using an embodiment represented in FIG. 4. The permanent magnet system with associated coil arrangement in this embodiment is extended in the axial direction in accordance with the transition from the exemplary embodiment of FIG. 1 to the exemplary embodiment of FIG. 2. Thus, the permanent magnet system with associated coil arrangement according to the invention makes optimum utilization of the available mounting room both in the axial and in the radial direction.

FIG. 4 likewise shows that in accordance with the embodiments of FIGS. 1-3 it is also possible instead of individual coils for a plurality of coils to interlock. As a result, a greater flexibility is provided in the control of the permanent magnet system with associated coil arrangement according to the invention. In the embodiment of FIG. 4, instead of one coil, two coils are inserted in each case in the coil arrangement. Further modifications are likewise contemplated to the effect that the individual coils of the embodiments of FIGS. 1-3 are replaced by a different number of coils. It is likewise contemplated that only some of the individual coils of FIGS. 1-3 are replaced by a plurality of coils.

FIG. 4 shows an embodiment of a permanent magnet system 4.1 with associated coil arrangement 4.2 according to the invention which is extended in the axial direction by comparison with the representation of FIG. 3 and, moreover, is distinguished by a larger number of coils. In this arrangement, the permanent magnet system 4.1 comprises an inner part 4.1.6 and an outer part 4.1.7.

The inner part 4.1.6 of the permanent magnet system 4.1 comprises a first axially polarized permanent magnet ring 4.1.1, a second permanent magnet ring 4.1.2 arranged behind this first permanent magnet ring 4.1.1 in the axial direction, and a third permanent magnet ring 4.1.3 arranged behind the first and the second permanent magnet rings 4.1.1 and 4.1.2 likewise in the axial direction. Like poles of the permanent magnet rings 4.1.1, 4.1.2 and 4.1.3 are opposite one another in each case. In the exemplary embodiment of FIG. 4, these are the north poles of the permanent magnet rings 4.1.1 and 4.1.2 and the south poles of the permanent magnet rings 4.1.2 and 4.1.3.

The two permanent magnet rings 4.1.1 and 4.1.2 and the two permanent magnet rings 4.1.2 and 4.1.3 are separated in each case by a soft magnetic spacing washer 4.1.4 and 4.1.5, which in FIG. 4, has a smaller diameter of the inner opening and a larger outside diameter than the permanent magnet rings 4.1.1, 4.1.2 and 4.1.3. As a result, a particularly intense focusing of the magnetic field can be achieved, since the magnetic field lines representing the magnetic field are thereby largely prevented from escaping in the radial direction from the permanent magnet rings 4.1.1, 4.1.2 and 4.1.3.

The outer part 4.1.7 of the permanent magnet system 4.1 comprises a fourth permanent magnet ring 4.1.8 which has a diameter such that it surrounds the permanent magnet ring 4.1.1 on the outside, with like poles of the permanent magnet rings 4.1.1 and 4.1.8 being directly adjacent. The outer part 4.1.7 has a fifth permanent magnet ring 4.1.9 which has a diameter such that it surrounds the permanent magnet ring 4.1.2 on the outside, like poles of the permanent magnet rings 4.1.2 and 4.1.9 being directly adjacent, and a sixth permanent magnet ring 4.1.10 which has a diameter such that it surrounds the permanent magnet ring 4.1.3 on the outside, like poles of the permanent magnet rings 4.1.3 and 4.1.10 being directly adjacent. Consequently, in accordance with the exemplary embodiment of FIG. 4, in the outer part 4.1.7 of the permanent magnet system 4.1 the north poles of the permanent magnet rings 4.1.8 and 4.1.9 and the south poles of the permanent magnet rings 4.1.9 and 4.1.10 are opposite one another.

In the outer part 4.1.7 of the permanent magnet system 4.1, the two permanent magnet rings 4.1.8 and 4.1.9 and the two permanent magnet rings 4.1.9 and 4.1.10 are separated in each case by a soft magnetic spacing washer 4.1.11 and 4.1.12, the soft magnetic spacing washer 4.1.11 having a smaller diameter of the inner opening than the permanent magnet rings 4.1.8 and 4.1.9 and a larger outside diameter than the permanent magnet rings 4.1.8 and 4.1.9. In the embodiment of FIG. 4, the soft magnetic spacing washer 4.1.12 has a smaller diameter of the inner opening than the permanent magnetic rings 4.1.9 and 4.1.10, and a larger outside diameter than the permanent magnet rings 4.1.9 and 4.1.10. As a result, a particularly intense focusing of the magnetic field can be achieved, since the magnetic field lines representing the magnetic field are thereby largely prevented from escaping in the radial direction from the permanent magnet rings 4.1.8 and 4.1.9 and 4.1.9 and 4.1.10.

Mounted as part of this permanent magnet system 4.1 is a coil arrangement 4.2 which comprises the coils 4.2.1, 4.2.2, 4.2.3, 4.2.4, 4.2.5, 4.2.6, 4.2.7, 4.2.8, 4.2.9, 4.2.10, 4.2.11, 4.2.12, 4.2.13, 4.2.14, 4.2.15 and 4.2.16. In this arrangement, the coils 4.2.1–4.2.4 are located inside the inner opening of the inner part 4.1.6 of the permanent magnet system 4.1. In this embodiment, the coil 4.2.1 is located inside the coil 4.2.2, and the center of the coils 4.2.1 and 4.2.2 is located in the axial direction at the level of the soft magnetic spacing washer 4.1.4. The coil 4.2.3 is located inside the coil 4.2.4, and the center of the coils 4.2.3 and 4.2.4 is located in the axial direction at the level of the soft magnetic spacing washer 4.1.5.

The coils 4.2.5–4.2.12 of the coil arrangement 4.2 surround the inner part 4.1.6 of the permanent magnet system 4.1 from the outside in this embodiment and are located at the same time inside the inner opening of the outer part 4.1.7 of the permanent magnet system 4.1. In this arrangement, the coils 4.2.5, 4.2.6, 4.2.9 and 4.2.10 are interlocked, and the center of the coils 4.2.5, 4.2.6, 4.2.9 and 4.2.10 is located in the axial direction at the level of the soft magnetic spacing washers 4.1.4 and The coils 4.2.7, 4.2.8, 4.2.11 and 4.2.12 are likewise interlocked, and the center of the coils 4.2.7, 4.2.8, 4.2.11 and 4.2.12 is located in the axial direction at the level of the soft magnetic spacing washers 4.1.5 and 4.1.12.

The coils 4.2.13–4.2.16 of the coil arrangement 4.2 surround the outer part 4.1.7 of the permanent magnet system 4.1 from the outside in this embodiment. The coils 4.2.13 and 4.2.14 are interlocked, and the center of the coils 4.2.13 and 4.2.14 is located in the axial direction at the level of the soft magnetic spacing washer 4.1.11. The coils 4.2.15 and 4.2.16 are likewise interlocked, and the center of the coils 4.2.15 and 4.2.16 is located in the axial direction at the level of the soft magnetic spacing washer 4.1.12.

In this embodiment, the coils 4.2.6 and 4.2.9 and the coils 4.2.8 and 4.2.11 are separated by a thin ring 4.3.1 of an amorphous, very soft magnetic and non-magnetostrictive material, for example, a metal foil. It is likewise possible for such thin-walled rings 4.3.2 and 4.3.3 which improve the magnetic flux to be mounted on the inner lateral surfaces of the coils 4.2.1 and 4.2.3 and on the outer lateral surfaces of the coils 4.2.14 and 4.2.16. A further improvement in the guidance of the magnetic flux is achieved by virtue of the fact that the rings 4.3.1 and 4.3.2 are provided with right-angled extensions 4.4.1, 4.4.2, 4.4.3, 4.4.4, 4.4.5, 4.4.6, 4.4.7 and 4.4.8 which are constructed in such a way that the magnetic field is guided from one pole to the other largely without leakage.

Because of the lower weight of the coil arrangement 4.2 by comparison with the permanent magnet system 4.1, in this arrangement the permanent magnet system 4.1 is fixedly mounted and the coil arrangement 4.2 movably mounted, producing a higher sensitivity of the permanent magnet system 4.1 with associated coil arrangement 4.2 when used in a loudspeaker or a sensor. It is also possible, however, for the coil arrangement 4.2 to be fixedly mounted and the permanent magnet system 4.1 movably mounted.

Figure 5:
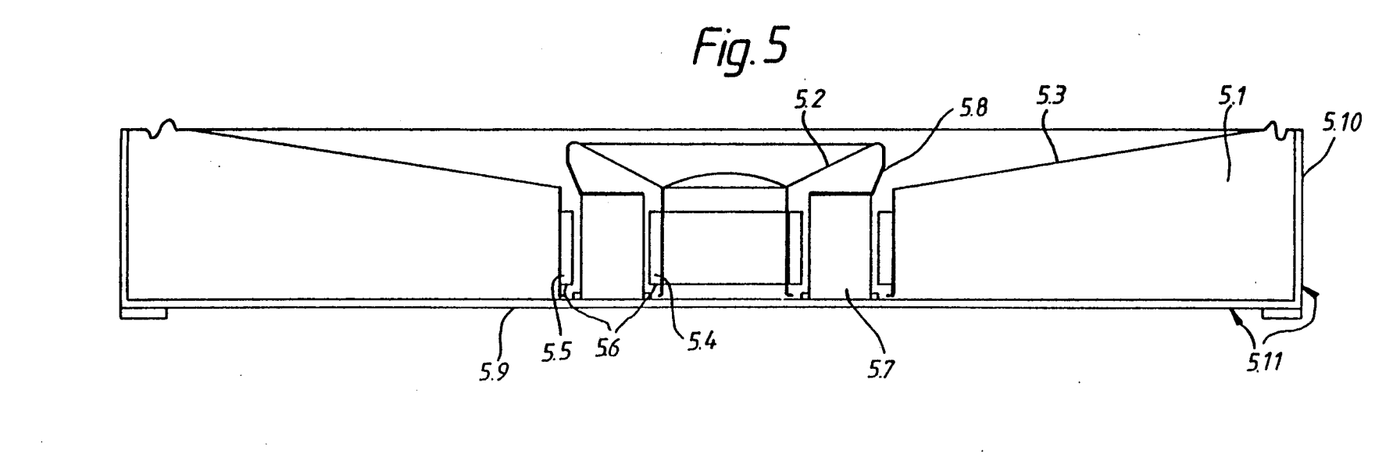
FIG. 5 shows a first possible use of a permanent magnet system with associated coil arrangement according to the invention in an analog-operated loudspeaker.

FIG. 5 shows a first possible use of a permanent magnet system with associated coil arrangement according to the present invention in accordance with the description relating to the embodiments of FIGS. 1–4 in an analog-operated loudspeaker 5.1. In this arrangement, the loudspeaker 5.1 has two diaphragms 5.2 and 5.3 which are connected to the different parts 5.4 and 5.5 of the coil arrangement 5.6. The embodiment of the coil arrangement 5.6 follows in accordance with one of the embodiments of a coil arrangement 1.2, 2.2, 3.2 or 4.2 according to the embodiments of FIGS. 1–4. In this arrangement, the electrical wiring of the coils of the parts 5.4 and 5.5 of the coil arrangement 5.6 is such that upon excitation of the coils by an electrical signal the forces produced by the interaction between the magnetic fields of the coils and the magnetic fields transmitted by the spacing washers assigned to the respective coils always have the same sign. The wiring of the coils of the coil arrangement 5.6 is advantageously parallel, so that differences in impedance occurring due to differing coil diameter can be compensated in a particularly simple way by connecting a resistor network upstream.

The parts 5.4 and 5.5 of the coil arrangement 5.6 are such that radially internal coils of the coil arrangement 5.6 are used as vibrating coils of the internal diaphragm 5.2, while radially external coils of the coil arrangement 5.6 are used as vibrating coils of the external diaphragm 5.3. Consequently, two diaphragms 5.2 and 5.3 with differing sound radiation spectra can be accommodated in one loudspeaker, it being the case that because of its smaller diameter by comparison with the external diaphragm 5.3, the internal diaphragm 5.2 operates principally in the treble range, while because of its larger diameter by comparison with the internal diaphragm 5.2 the diaphragm 5.3 operates principally in the bass range. It is therefore possible by a suitable subdivision of the coils of the coil arrangement 5.6 with respect to the parts 5.4 and 5.5 to realize an advantageous embodiment of a loudspeaker by using only one permanent magnet system 5.7 in conjunction with a small size. FIG. 5 shows an exemplary embodiment of such a loudspeaker in which the internal diaphragm 5.2 is mounted in a frame 5.8, this frame 5.8 being supported on the base plate 5.9 of the loudspeaker 5.1 by means of the permanent magnet system 5.7. The diaphragm 5.2 thus forms with the inner part 5.4 of the coil arrangement 5.6 a configuration capable of vibrating by means of which principally sounds in the treble range are reproduced. The external diaphragm 5.3 is connected, in a manner so that it can vibrate, to the side walls 5.10 of the loudspeaker housing 5.11, which comprises the base plate 5.9 and the side walls 5.10. Furthermore, this external diaphragm 5.3 is firmly connected to the part 5.5 of the coil arrangement 5.6.

Figure 6:
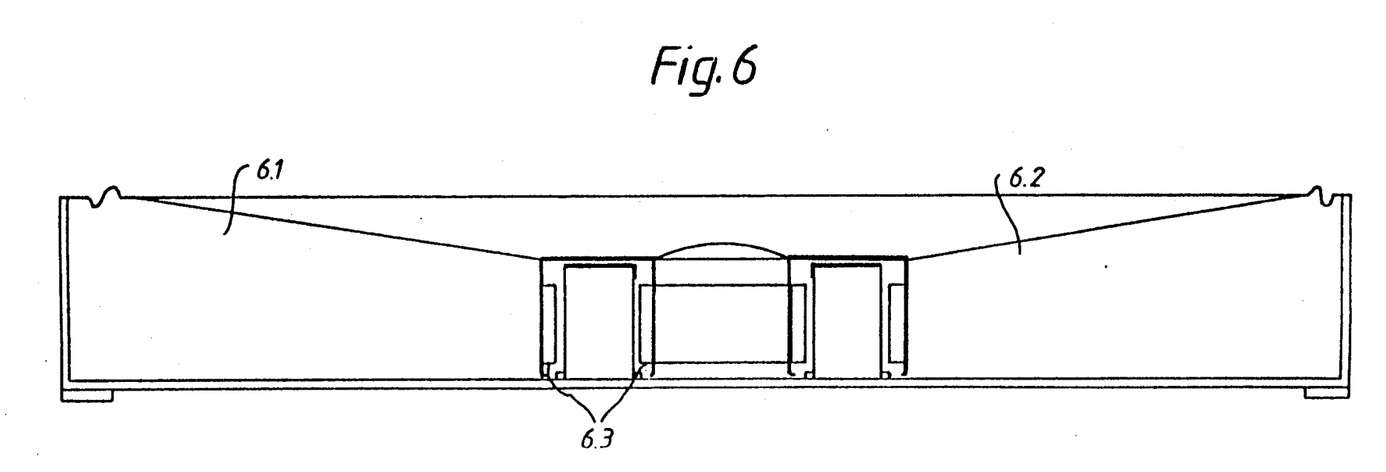
FIG. 6 shows a second possible use of a permanent magnet system with associated coil arrangement according to the invention in an analog-operated loudspeaker.

FIG. 6 shows a representation of a second possible use of a permanent magnet system with associated coil arrangement according to the invention in accordance with the description relating to the representations of FIGS. 1–4 in an analog-operated loudspeaker 6.1, in which the diaphragm 6.2 is not subdivided, by contrast with the loudspeaker 5.1 of the representation according to FIG. 5. This means that the diaphragm 6.2 consists of one piece and that, consequently, there is also no subdivision of the coil arrangement 6.3, the diaphragm 6.2 being instead fastened in one piece to the coil arrangement 6.3. In the exemplary embodiment according to FIG. 6, as well, the electrical wiring of the coils of the coil arrangement 6.3 is such that upon excitation of the coils by an electrical signal the forces produced by the interaction between the magnetic fields of the coils and the magnetic fields transmitted by the spacing washers assigned to the respective coils always have the same sign. The wiring of the coils of the coil arrangement 6.3 is advantageously parallel, so that differences in impedance occurring due to differing coil diameters can be compensated in a particularly simple way by connecting a resistor network upstream.

Figure 7:
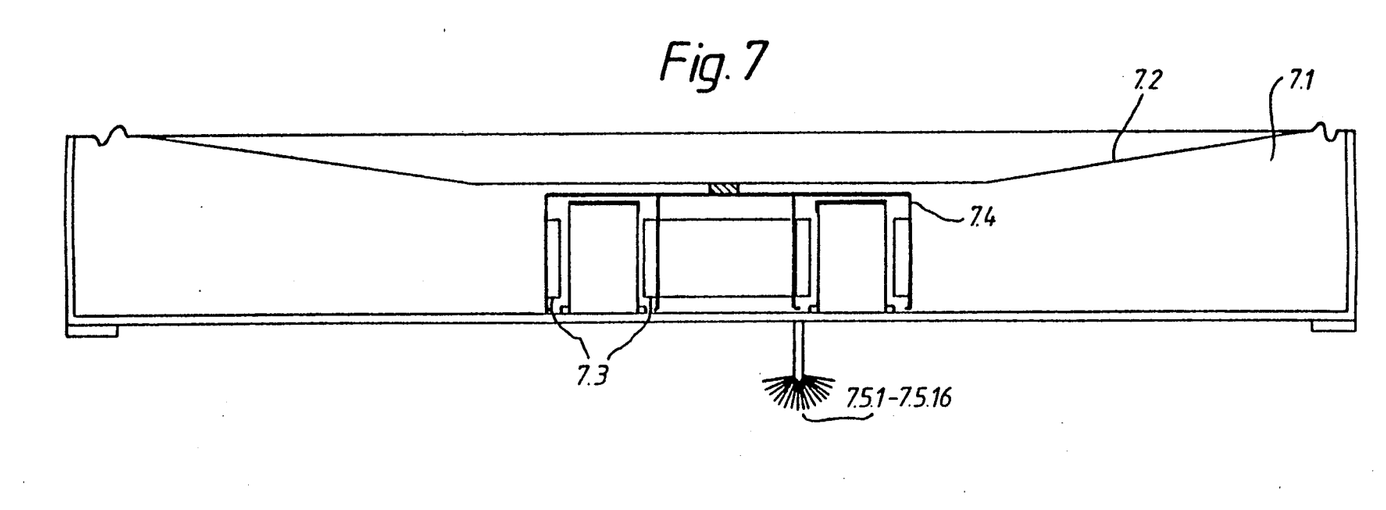
FIG. 7 shows a possible use of a permanent magnet system with associated coil arrangement according to the invention in a digitally-operated loudspeaker.

FIG. 7 provides a representation of a third possible use of a permanent magnet system with associated coil arrangement according to the invention in accordance with the description relating to the representations of FIGS. 1 to 4 in a digitally operated loudspeaker 7.1. In this arrangement, the diaphragm 7.2 of the loudspeaker 7.1 is not subdivided and is connected as a whole to the coil arrangement 7.3. In order to avoid distortions in the frequency response of the loudspeaker it is advantageously possible in this arrangement firstly to connect the vibrating coils of the coil arrangement 7.3 to one another, as represented in the exemplary embodiment of FIG. 7 by the connecting plate 7.4. The diaphragm 7.2 can then be fastened to the connecting plate 7.4. According to the symbolic representation of FIG. 7, the coil arrangement 7.3 comprises a plurality of vibrating coils, so that on the basis of the assignment of one bit per vibrating coil a satisfactorily effective resolution of the digitally operated loudspeaker 7.1 is provided. Particularly, to be recommended is the use of permanent magnet system with associated coil arrangement according to the representation of FIG. 4, in which 16 vibrating coils are present. That is to say, a 16-bit loudspeaker can be realized. In this case, the vibrating coils in the exemplary embodiment of FIG. 7 are controlled via the signal lines 7.5.1–7.5.16. If the coil arrangement 7.3 has a number of vibrating coils other than 16, the number of signal lines changes accordingly.

Figure 8:
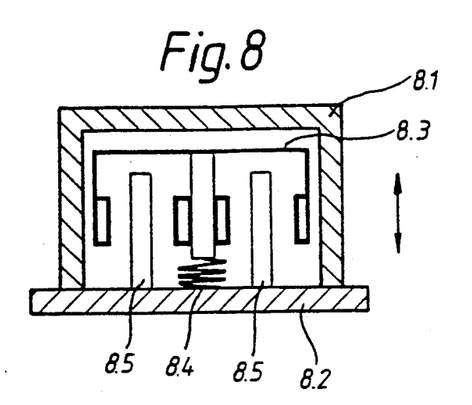
FIG. 8 shows a second possible use of a permanent magnet system with associated coil arrangement according to the invention in a sensor.

FIG. 8 shows a representation of a first possible use of a permanent magnet system with associated coil arrangement according to the invention in accordance with the description relating to the representations of FIGS. 1 to 4 in a sensor 8.1. In the exemplary embodiment of FIG. 8, this sensor 8.1 is an acceleration sensor. It is possible, for example, to investigate vibrations of machines by connecting the underside 8.2 of the sensor 8.1 firmly to the housing of the machine. The sensor 8.1 can likewise also be fastened to a device, whose acceleration is to be measured, in such a way that the acceleration is to be measured, in such a way that the acceleration can be derived from the deflection of the coil arrangement. The coil arrangement 8.3, which is capable of vibrating, is connected by means of a spring 8.4 to the underside 8.2 of the sensor 8.1. The permanent magnet system 8.5 has a firm connection to the underside 8.2 of the sensor 8.1. The voltage induced in the coil arrangement 8.3 is directly proportional to the acceleration. The coils of the coil arrangement 8.3 are connected electrically in series, so that there is an adding together of the electrical voltages induced in the individual coils of the coil arrangement 8.3 due to a movement of the coil arrangement 8.3 by the magnetic fields transmitted by the soft magnetic spacing washers assigned to the respective coils. In this case, the winding sense of the coils must be such that the addition of the electrical voltages is correct in terms of sign.

Figure 9:
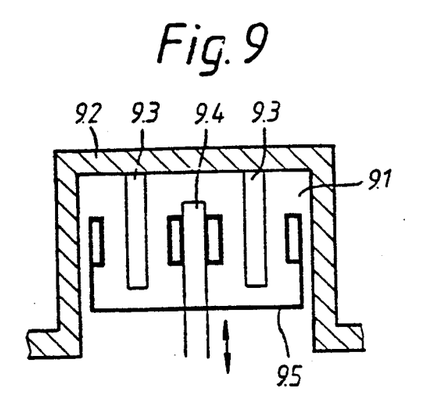
FIG. 9 shows a second possible use of a permanent magnet system with associated coil arrangement according to the invention in a sensor.

FIG. 9 shows a representation of a second possible use of a permanent magnet system with associated coil arrangement according to the invention in accordance with the description relating to the representations of FIGS. 1 to 4 in a sensor 9.1. In the exemplary embodiment of FIG. 9, this sensor 9.1 is a vibration sensor. In this arrangement, the permanent magnet system 9.3 is firmly connected to the housing 9.2 of the sensor 9.1. The vibrational movements are transmitted to the coil arrangement 9.5 by means of a rod 9.4. Care is to be taken in this regard that the amplitude of vibration is below the value that would cause the coil arrangement 9.5 to strike against the housing 9.2, or to change its position relative to the permanent magnet system 9.3 such that a voltage would no longer be induced. The voltage induced in the coil arrangement 9.5 is proportional to the speed of the vibrational movement. The vibrational acceleration can therefore be obtained by a differentiation, and the deflection of the vibrational movement by an integration. The coils of the coil arrangement 9.5 are connected electrically in series, so that there is an adding together of the electrical voltages induced in the individual coils of the coil arrangement 9.5 due to a movement of the coil arrangement 9.5 by the magnetic fields transmitted by the soft magnetic spacing washers assigned to the respective coils. In this case, the winding sense of the coils must be such that the addition of the electrical voltages is correct in terms of sign.

Figure 10:
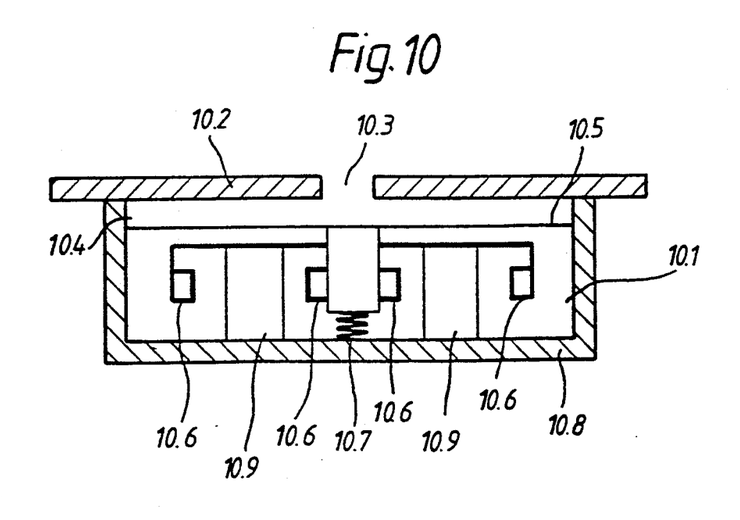
FIG. 10 shows a third possible use of a permanent magnet system with associated coil arrangement according to the invention in a sensor.

FIG. 10 shows a representation of a second possible use of a permanent magnet system with associated coil arrangement according to the invention in accordance with the description relating to the representations of FIGS. 1 to 4 in a sensor 10.1. In the exemplary embodiment of FIG. 10, this sensor 10.1 is a pressure sensor. The side 10.2 of the housing of the sensor 10.1 has an opening 10.3 in this arrangement, so that when the side 10.2 of the housing of the sensor 10.1 is mounted on the surface of the volume in which the pressure is to be determined an equalization of pressure takes place with respect to the volume 10.4. In this case, the pressure to be measured acts on the diaphragm 10.5, which is firmly connected to the coil arrangement 10.6. This coil arrangement 10.6 is supported, furthermore, on the housing underside 10.8 by means of a spring 10.7. The permanent magnet system 10.9 is firmly connected to the housing underside 10.8. The voltage induced in the coil arrangement 10.6 is proportional to the time variation of the pressure, so that the pressure can be obtained directly by an integration with respect to the time. The coils of the coil arrangement 10.6 are connected electrically in series, so that there is an adding together of the electrical voltages induced in the individual coils of the coil arrangement 10.6 due to a movement of the coil arrangement 10.6 by the magnetic fields transmitted by the soft magnetic spacing washers assigned to the respective coils. In this case, the winding sense of the coils must be such that the addition of the electrical voltages is correct in terms of sign.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Permanent magnet system with associated coil arrangement, comprising:

two axially polarized permanent magnet rings which are mounted one behind another in the axial direction with like poles of the permanent magnet rings being opposite one another;

a first soft magnetic spacing washer arranged between the two permanent magnet rings;

a first coil that surrounds the outside of the permanent magnet rings such that a central axis of the first coil coincides with a central axis of the permanent magnet rings, an axial center of the first coil being located in a normal position of the first coil at a level of the soft magnetic spacing washer;

wherein at least a second coil is located inside an inside diameter of the permanent magnet rings such that the central axis of the second coil coincides with the central axis of the permanent magnet rings, the center of the second coil being located in a normal position of the second coil at the level of the soft magnetic spacing washer.

2. The system of claim 1, further comprising an axial extension having a third axially polarized permanent magnet ring and a second soft magnetic spacing washer, axially arranged in relation to the two axially polarized permanent magnet rings and in relation to the second soft magnetic spacing washer such that like poles of the third axially polarized permanent magnet ring and of the first permanent magnet ring being opposite one another, the first permanent magnet ring being adjacent to the third permanent magnet ring, and the third permanent magnet ring being separated from the first permanent magnet ring by the second soft magnetic spacing washer;

at least a third coil that surrounds the first, second and third permanent magnet rings on the outside of said permanent magnet rings such that a central axis of the third coil coincides with the central axis of the permanent magnet rings, the center of the third coil being located in a normal position of the third coil at the level of the second soft magnetic spacing washer; and at least a fourth coil arranged inside the inside diameter of the permanent magnet rings such that a central axis of the fourth coil coincides with the central axis of the permanent magnet rings, the center of the fourth coil being located in a normal position of the fourth coil at the level of the second soft magnetic spacing washer.

3. The system of claim 2, wherein the soft magnetic spacing washers have a smaller inside diameter and a larger outside diameter than the permanent magnet rings that are separated by the respective soft magnetic spacing washers.

4. The system of claim 2, further comprising a radial extension having at least a fourth axially polarized permanent magnet ring and at least a third soft magnetic spacing washer a central axis of the fourth permanent magnet ring and of the third soft magnetic spacing washer coinciding with the central axes of the first, second and third permanent magnet rings, an inside diameter of the fourth permanent magnet ring being larger than an outside diameter of the first, second and third permanent magnet rings and of the first and second soft magnetic spacing washers such that at least a fifth coil is insertable between the fourth permanent magnet ring and the first, second and third permanent magnet rings and the first and second soft magnetic spacing washers, an inside diameter of the third soft magnetic spacing washer being larger than the outside diameters of the first, second and third permanent magnet rings and the first and second soft magnetic spacing washers such that at least a sixth coil is insertable between the third soft magnetic spacing washer and the first, second and third permanent magnet rings and the first and second soft magnetic spacing washers, with like poles of the fourth permanent magnet ring and of an adjacent first, second or third permanent magnet ring being directly adjacent to one another, and wherein the fourth permanent magnet ring is surrounded on the outside by at least a seventh coil such that a central axis of the seventh coil coincides with the central axis of the fourth permanent magnet ring, the center of the seventh coil being located in a normal position of the seventh coil at the level of the third soft magnetic spacing washer, and at least an eighth coil is located inside an inside diameter of the fourth permanent magnet ring such that the central axis of the eighth coil coincides with the central axis of the fourth permanent magnet ring, the center of the eighth coil being located in a normal position of the eighth coil at the level of the third soft magnetic spacing washer, and a layer of an amorphous, very soft magnetic and non-magnetostrictive material located between the eighth coil and the third coil surrounding the permanent magnet rings on the outside.

5. The system of claim 4, wherein the soft magnetic spacing washers have a smaller inside diameter and a larger outside diameter than the permanent magnet rings that are separated by the respective soft magnetic spacing washers.

6. The system of claim 1, wherein a layer of an amorphous, very soft magnetic and non-magnetostrictive material is located at least on one of the inner lateral surface of the internal coils and on the outer lateral surface of the external coils.

7. The system of claim 6, wherein the layer is a metal foil forming a thin-walled ring.

8. The system of claim 7, wherein the layer is provided at its ends points with an extension in the direction of the poles of the corresponding permanent magnet ring.

9. The system of claim 1, wherein the soft magnetic spacing washers have a smaller inside diameter and a larger outside diameter than the permanent magnet rings that are separated by the respective soft magnetic spacing washers.

10. The system of claim 1, wherein at least one of the coils is a plurality of at least two interlocking coils.

11. The system of claim 1, further comprising a radial extension having at least a third axially polarized permanent magnet ring and at least a second soft magnetic spacing washer, a central axis of the third permanent magnet ring and of the second soft magnetic spacing washer coinciding with the central axes of the first and second permanent magnet rings, an inside diameter of the third permanent magnet ring being larger than an outside diameter of the first and second permanent magnet rings and of the first soft magnetic spacing washer such that at least a third coil is insertable between the third permanent magnet ring and the first and second permanent magnet rings and the first soft magnetic spacing washer, an inside diameter of the second soft magnetic spacing washer being larger than the outside diameters of the first and second permanent magnet rings and the first and second soft magnetic spacing washers such that at least a fourth coil is insertable between the second soft magnetic spacing washer and the first and second permanent magnet rings and the first and second soft magnetic spacing washers, with like poles of the third permanent magnet ring and of an adjacent first or second permanent magnet ring being directly adjacent to one another, and wherein the third permanent magnet ring is surrounded on the outside by at least a fifth coil such that a central axis of the fifth coil coincides with the central axis of the third permanent magnet ring, the center of the fifth coil being located in a normal position of the fifth coil at the level of the second soft magnetic spacing washer, and at least a sixth coil is located inside an inside diameter of the third permanent magnet ring such that the central axis of the sixth coil coincides with the central axis of the third permanent magnet ring, the center of the sixth coil being located in a normal position of the sixth coil at the level of the second soft magnetic spacing washer, and a layer of an amorphous, very soft magnetic and non-magnetostrictive material located between the sixth coil and the third coil surrounding the permanent magnet rings on the outside.

12. An analog-controlled loudspeaker comprising;
a diaphragm; and
a permanent magnet system with associated coil arrangement, that includes:
two axially polarized permanent magnet rings which are mounted one behind another in the axial direction with like poles of the permanent magnet rings being opposite one another;
a first soft magnetic spacing washer arranged between the two permanent magnet rings;
a first coil that surrounds the outside of the permanent magnet rings such that a central axis of the first coil coincides with a central axis of the permanent magnet rings, an axial center of the first coil being located in a normal position of the first coil at a level of the soft magnetic spacing washer;
wherein at least a second coil is located inside an inside diameter of the permanent magnet rings such that the central axis of the second coil coincides with the central axis of the permanent magnet rings, the center of the second coil being located in a normal position of the second coil at the level of the soft magnetic spacing washer.

13. Loudspeaker according to claim 12, wherein the diaphragm of the loudspeaker consists of one piece and is firmly connected to the coil arrangement in such a way that the coil arrangement drives the loudspeaker diaphragm as a vibrating-coil arrangement.

14. Loudspeaker according to claim 13, wherein the coils of the coil arrangement are firmly connected to one another by a connecting plate, and in that a firm connection of the diaphragm exists with the connecting plate.

15. Loudspeaker according to claim 12, wherein the coil arrangement is subdivided into radially internal coils and radially external coils, and in that the diaphragm is subdivided corresponding to the subdivision of the coil arrangement into a plurality of parts, of which each part of the diaphragm is connected to a part of the coils of the coil arrangement.

16. The loudspeaker of claim 12, further comprising an axial extension having a third axially polarized permanent magnet ring and a second soft magnetic spacing washer, axially arranged in relation to the two axially polarized permanent magnet rings and in relation to the second soft magnetic spacing washer such that like poles of the third axially polarized permanent magnet ring and of the first permanent magnet ring being opposite one another, the first permanent magnet ring being adjacent to the third permanent magnet ring, and the third permanent magnet ring being separated from the first permanent magnet ring by the second soft magnetic spacing washer;
at least a third coil that surrounds the first, second and third permanent magnet rings on the outside of said permanent magnet rings such that a central axis of the third coil coincides with the central axis of the permanent magnet rings, the center of the third coil being located in a normal position of the third coil at the level of the second soft magnetic spacing washer; and
at least a fourth coil arranged inside the inside diameter of the permanent magnet rings such that a central axis of the fourth coil coincides with the central axis of the permanent magnet rings, the center of the fourth coil being located in a normal position of the fourth coil at the level of the second soft magnetic spacing washer.

17. The loudspeaker of claim 16, further comprising a radial extension having at least a fourth axially polarized permanent magnet ring and at least a third soft magnetic spacing washer, a central axis of the fourth permanent magnet ring and of the third soft magnetic spacing washer coinciding with the central axes of the first, second and third permanent magnet rings, an inside diameter of the fourth permanent magnet ring being larger than an outside diameter of the first, second and third permanent magnet rings and of the first and second soft magnetic spacing washers such that at least a fifth coil is insertable between the fourth permanent magnet ring and the first, second and third permanent magnet rings and the first and second soft magnetic spacing washers, an inside diameter of the third soft magnetic spacing washer being larger than the outside diameters of the first, second and third permanent magnet rings and the first and second soft magnetic spacing washers such that at least a sixth coil is insertable between the third soft magnetic spacing washer and the first, second and third permanent magnet rings and the first and second soft magnetic spacing washers, with like poles of the fourth permanent magnet ring and of an adjacent first, second or third permanent magnet ring being directly adjacent to one another, and wherein the fourth permanent magnet ring is surrounded on the outside by at least a seventh coil such that a central axis of the seventh coil coincides with the central axis of the fourth permanent magnet ring, the center of the seventh coil being located in a normal position of the seventh coil at the level of the third soft magnetic spacing washer, and at least an eighth coil is located inside an inside diameter of the fourth permanent magnet ring such that the central axis of the eighth coil coincides with the central axis of the fourth permanent magnet ring, the center of the eighth coil being located in a normal position of the eighth coil at the level of the third soft magnetic spacing washer, and a layer of an amorphous, very soft magnetic and non-magnetostrictive material located between the eighth coil and the third coil surrounding the permanent magnet rings on the outside.

18. A digitally-controlled loudspeaker, comprising:
   a diaphragm;
   a permanent magnet system with associated coil arrangement, including:
   two axially polarized permanent magnet rings which are mounted one behind another in the axial direction with like poles of the permanent magnet rings being opposite one another;
   a first soft magnetic spacing washer arranged between the two permanent magnet rings;
   a first coil that surrounds the outside of the permanent magnet rings such that a central axis of the first coil coincides with a central axis of the permanent magnet rings, an axial center of the first coil being located in a normal position of the first coil at a level of the soft magnetic spacing washer;
   wherein at least a second coil is located inside an inside diameter of the permanent magnet rings such that the central axis of the second coil coincides with the central axis of the permanent magnet rings, the center of the second coil being located in a normal position of the second coil at the level of the soft magnetic spacing washer;
   wherein the coil arrangement is subdivided such that each control signal to a coil corresponds to one bit.

19. The loudspeaker of claim 18, further comprising an axial extension having a third axially polarized permanent magnet ring and a second soft magnetic spacing washer, axially arranged in relation to the two axially polarized permanent magnet rings and in relation to the second soft magnetic spacing washer such that like poles of the third axially polarized permanent magnet ring and of the first permanent magnet ring being opposite one another, the first permanent magnet ring being adjacent to the third permanent magnet ring, and the third permanent magnet ring being separated from the first permanent magnet ring by the second soft magnetic spacing washer;
   at least a third coil that surrounds the first, second and third permanent magnet rings on the outside of said permanent magnet rings such that a central axis of the third coil coincides with the central axis of the permanent magnet rings, the center of the third coil being located in a normal position of the third coil at the level of the second soft magnetic spacing washer; and
   at least a fourth coil arranged inside the inside diameter of the permanent magnet rings such that a central axis of the fourth coil coincides with the central axis of the permanent magnet rings, the center of the fourth coil being located in a normal position of the fourth coil at the level of the second soft magnetic spacing washer.

20. The loudspeaker of claim 19, further comprising a radial extension having at least a fourth axially polarized permanent magnet ring and at least a third soft magnetic spacing washer, a central axis of the fourth permanent magnet ring and of the third soft magnetic spacing washer coinciding with the central axes of the first, second and third permanent magnet rings, an inside diameter of the fourth permanent magnet ring being larger than an outside diameter of the first, second and third permanent magnet rings and of the first and second soft magnetic spacing washers such that at least a fifth coil is insertable between the fourth permanent magnet ring and the first, second and third permanent magnet rings and the first and second soft magnetic spacing washers, an inside diameter of the third soft magnetic spacing washer being larger than the outside diameters of the first, second and third permanent magnet rings and the first and second soft magnetic spacing washers such that at least a sixth coil is insertable between the third soft magnetic spacing washer and the first, second and third permanent magnet rings and the first and second soft magnetic spacing washers, with like poles of the fourth permanent magnet ring and of an adjacent first, second or third permanent magnet ring being directly adjacent to one another, and wherein the fourth permanent magnet ring is surrounded on the outside by at least a seventh coil such that a central axis of the seventh coil coincides with the central axis of the fourth permanent magnet ring, the center of the seventh coil being located in a normal position of the seventh coil at the level of the third soft magnetic spacing washer(s), and at least an eighth coil is located inside an inside diameter of the fourth permanent magnet ring such that the central axis of the eighth coil coincides with the central axis of the fourth permanent magnet ring, the center of the eighth coil being located in a normal position of the eighth coil at the level of the third soft magnetic spacing washer, and a layer of an amorphous, very soft magnetic and non-magnetostrictive material located between the eighth coil and the third coil surrounding the permanent magnet rings on the outside.

21. A sensor for determining a motion-dependent variable, comprising:
   a permanent magnet system with associated coil arrangement, including:
   two axially polarized permanent magnet rings which are mounted one behind another in the axial direction with like poles of the permanent magnet rings being opposite one another;
   a first soft magnetic spacing washer arranged between the two permanent magnet rings;
   a first coil that surrounds the outside of the permanent magnet rings such that a central axis of the first coil coincides with a central axis of the permanent magnet rings, an axial center of the first coil being located in a normal position of the first coil at a level of the soft magnetic spacing washer;
   wherein at least a second coil is located inside an inside diameter of the permanent magnet rings such that the central axis of the second coil coincides with the central axis of the permanent magnet rings, the center of the second coil being located in a normal position of the second coil at the level of the soft magnetic spacing washer;

wherein a movement of the coil arrangement with respect to the permanent magnet system induces a voltage in the coils of the coil arrangement.

22. Sensor according to claim 21, wherein the coil arrangement is firmly connectable to a body exerting a vibration, the permanent magnet system being arranged in a fixed position.

23. Sensor according to claim 21, wherein the permanent magnet system is firmly connected by the base of a housing to a sensing object which executes a movement, and the coil arrangement is supported on the base of a housing by a spring in such a way that given a deflection of the coil arrangement from its rest position a restoring force proportional to this deflection is produced.

24. Sensor according to claim 21, wherein the coil arrangement is directly subjected to a pressure which leads to a deflection of the coil arrangement relative to the permanent magnet system which is proportional to the pressure, the permanent magnet system being arranged in a fixed position.

25. The sensor of claim 21, further comprising an axial extension having a third axially polarized permanent magnet ring and a second soft magnetic spacing washer, axially arranged in relation to the two axially polarized permanent magnet rings and in relation to the second soft magnetic spacing washer such that like poles of the third axially polarized permanent magnet ring and of the first permanent magnet ring being opposite one another, the first permanent magnet ring being adjacent to the third permanent magnet ring, and the third permanent magnet ring being separated from the first permanent magnet ring by the second soft magnetic spacing washer;

at least a third coil that surrounds the first, second and third permanent magnet rings on the outside of said permanent magnet rings such that a central axis of the third coil coincides with the central axis of the permanent magnet rings, the center of the third coil being located in a normal position of the third coil at the level of the second soft magnetic spacing washer; and at least a fourth coil arranged inside the inside diameter of the permanent magnet rings such that a central axis of the fourth coil coincides with the central axis of the permanent magnet rings, the center of the fourth coil being located in a normal position of the fourth coil at the level of the second soft magnetic spacing washer.

26. The sensor of claim 25, further comprising a radial extension having at least a fourth axially polarized permanent magnet ring and at least a third soft magnetic spacing washer a central axis of the fourth permanent magnet ring and of the third soft magnetic spacing washer coinciding with the central axes of the first, second and third permanent magnet rings, an inside diameter of the fourth permanent magnet ring being larger than an outside diameter of the first, second and third permanent magnet rings and of the first and second soft magnetic spacing washers such that at least a fifth coil is insertable between the fourth permanent magnet ring and the first, second and third permanent magnet rings and the first and second soft magnetic spacing washers, an inside diameter of the third soft magnetic spacing washer being larger than the outside diameters of the first, second and third permanent magnet rings and the first and second soft magnetic spacing washers such that at least a sixth coil is insertable between the third soft magnetic spacing washer and the first, second and third permanent magnet rings and the first and second soft magnetic spacing washers, with like poles of the fourth permanent magnet ring and of an adjacent first, second or third permanent magnet ring being directly adjacent to one another, and wherein the fourth permanent magnet ring is surrounded on the outside by at least a seventh coil such that a central axis of the seventh coil coincides with the central axis of the fourth permanent magnet ring, the center of the seventh coil being located in a normal position of the seventh coil at the level of the third soft magnetic spacing washer(s), and at least an eighth coil is located inside an inside diameter of the fourth permanent magnet ring such that the central axis of the eighth coil coincides with the central axis of the fourth permanent magnet ring, the center of the eighth coil being located in a normal position of the eighth coil at the level of the third soft magnetic spacing washer, and a layer of an amorphous, very soft magnetic and non-magnetostrictive material located between the eighth coil and the third coil surrounding the permanent magnet rings on the outside.

* * * * *